(12) United States Patent
Maier et al.

(10) Patent No.: US 9,925,632 B2
(45) Date of Patent: Mar. 27, 2018

(54) ALIGNMENT DEVICE FOR ASSEMBLING COMPONENTS AND METHOD OF USE

(71) Applicant: FORD GLOBAL TECHNOLOGIES, LLC, Dearborn, MI (US)

(72) Inventors: Ruediger Maier, Creutzwald (FR); Bert Niessen, Heimbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 449 days.

(21) Appl. No.: 13/757,067

(22) Filed: Feb. 1, 2013

(65) Prior Publication Data

US 2013/0199018 A1    Aug. 8, 2013

(30) Foreign Application Priority Data

Feb. 3, 2012   (DE) .................. 10 2012 201 628

(51) Int. Cl.
*B23Q 3/18* (2006.01)
*B25B 11/00* (2006.01)
*B23K 37/04* (2006.01)

(52) U.S. Cl.
CPC .......... *B23Q 3/186* (2013.01); *B23K 37/0408* (2013.01); *B25B 11/00* (2013.01); *B23Q 2240/005* (2013.01); *Y10T 29/49895* (2015.01)

(58) Field of Classification Search
CPC .......... Y10T 29/49895; Y10T 29/49899; Y10T 29/49902; B23Q 3/18; B23Q 3/183; B23Q 3/186; B23Q 2240/005; B23K 37/0408; B25B 11/00
USPC ....................... 269/47, 50, 51, 53, 54.4, 54.5
See application file for complete search history.

(56) References Cited

U.S. PATENT DOCUMENTS

| | | | | |
|---|---|---|---|---|
| 5,074,536 | A * | 12/1991 | McConkey | ............. B25B 27/16 269/43 |
| 5,566,840 | A * | 10/1996 | Waldner et al. | ............ 211/41.17 |
| 6,022,009 | A * | 2/2000 | Hill | ................................ 269/47 |
| 6,944,927 | B2 * | 9/2005 | Nakamura | ................. 29/407.01 |
| 2004/0070130 | A1 * | 4/2004 | Pavlik et al. | ................... 269/32 |
| 2004/0205953 | A1 * | 10/2004 | Marume et al. | ................ 29/464 |

FOREIGN PATENT DOCUMENTS

DE       10222008 A1    12/2003

* cited by examiner

*Primary Examiner* — Christopher M Koehler
(74) *Attorney, Agent, or Firm* — Marla Johnston; Brooks Kushman P.C.

(57) ABSTRACT

A fixture for positioning a component in a desired location in a first plane for assembly, machining, or other processing related to manufacturing. The fixture includes a holder establishing a reference position within a second plane parallel with the first plane, and a pin retained by the holder for movement relative thereto in the second plane within a range of coarse alignment about the reference position. The pin and holder are movable together normal to the second plane to engage the pin with the locating feature. A fixing element is movable, when the pin is engaged with the feature, to urge the pin to the reference position.

12 Claims, 4 Drawing Sheets

ALIGNMENT DEVICE FOR ASSEMBLING COMPONENTS AND METHOD OF USE

CROSS-REFERENCE TO RELATED APPLICATIONS

This application claims foreign priority benefits under 35 U.S.C. § 119(a)-(d) to DE 10 2012 201 628.7 filed Feb. 3, 2012, which is hereby incorporated by reference in its entirety.

TECHNICAL FIELD

The invention relates to a device for positioning and/or adjusting a body component relative to another device utilized in a production process, such as a fixture, tool, jig, or industrial robot.

BACKGROUND

It is widely known to use position adjusting pins for positioning and/or adjusting components prior to and/or during an assembly, machining, or forming process.

Thus, for example, two plates to be welded in opposing positions may be positioned by one respective adjusting pin and thus fixed in their position relative to one another to be secured. If a bore is present in the body component, the adjusting pin may be inserted into said bore as a locating feature for positioning and/or securing the corresponding body component. Thus the adjusting pin may be inserted into the bore in the manner of a adjusting pin, whereby a positionally accurate adjustment of the body component is possible.

A single locating feature (such as a hole) in a component, for example in the A-column (master 4-way locator) may be engaged several time (up to four times is not uncommon) by different holding or locating devices or frames during an assembly process. In such a case, the component is stopped in a defined position and the device which is fastened to a robot or a linear movement receiver is then moved toward the body. Rough adjustment guides and fine adjustment guides may be used to avoid damage and substantial deviations of the pins from the feature position. The pin may be of pointed/conical shape on the tip or component-engaging end, subsequently merging into a cylindrical shape, in order to be able to compensate for deviations of, for example up to 5 mm from the nominal or final position.

In this case, a pin with a pointed or conical tip may be utilized in order to insert and accurately align the device.

As a result of the high weight of the devices (up to 500 Kg) together with the necessity of achieving the shortest possible production cycle times (saving process time), the insertion of a conically shaped pin may also leads to damage to the locating hole which may manifest itself as a radial protrusion or axial indentation.

It is possible, therefore, that subsequent alignment operations are no longer able to achieve the required dimensional setting quality, as the locating hole has been effectively "enlarged" and/or stretched in the preliminary steps. Moreover, due to the deformation, subsequently inserted sealing plugs are potentially unable to sit correctly and may no longer be able to perform their sealing functions. This fault is particularly serious as it is difficult to detect. Often, the end customer is the first to detect the error by discovering water in the interior.

The generally known adjusting pin is produced from steel and is subjected to a relatively high degree of wear in the entire outer region of the front part, which disadvantageously leads to a relatively short service life and frequent replacement. Additionally, it may be necessary to reposition an adjusting pin as a result of the wear.

Attempts have been made to make the adjusting pin more wear-resistant by using a connecting part comprising a ceramic material. This, however, does not provide a solution to the above problems of the stretching of the adjustment holes and/or locating holes.

SUMMARY

In an embodiment disclosed herein, a component alignment apparatus comprises a pin movable along an axis to engage a locating feature of a component, a holder retaining the pin for movement about a reference position within a plane normal to the axis, and a fixing element movable, when the pin is engaged with the feature, to urge the pin to the reference position. The reference position is aligned with a final, desired, precise position of the feature, so that movement of the fixing element drives the locating feature to the precise position.

In a disclosed embodiment, the pin has a first end for engaging the feature and an opposite end with a first aligning surface. The fixing element has a second aligning surface that is complementary-shaped relative to the first aligning surface so as to be matingly engageable therewith, and axial movement of the pin relative to the fixing element brings the first and second aligning surfaces into engagement. The engagement centers the pin with respect to the reference position. The first and second aligning surfaces may be conical, for example.

In another disclosed embodiment, the fixing element comprises at least three centering elements arranged circumferentially about the pin and movable radially inward to urge the pin to the reference position. The centering elements may be driven inward by, for example, an electrical actuator, a hydraulic actuator, a pneumatic actuator or an electromagnetic actuator.

In another disclosed embodiment, a method for positioning a component comprises moving a pin relative to the component along an engagement axis to engage a reference feature of the component and fix the feature in a coarsely aligned position in a plane normal to the axis, and subsequently moving a fixing element relative to the pin to urge the pin to a precisely aligned position.

In another disclosed embodiment of the method, the step of moving the fixing element comprises moving at least one of the pin and the element along a second axis parallel with the engagement axis.

In another disclosed embodiment of the method, the pin has a first aligning surface, and the fixing element has a second aligning surface complementally shaped with respect to the first aligning surface. Movement of the fixing element relative to the pin brings the first and second aligning surfaces into engagement to thereby center the pin with respect to the precisely aligned position.

In another disclosed embodiment of the method, the step of moving the pin comprises moving a holder along with the pin, the holder retaining the pin for movement normal to the insertion axis about the precisely aligned position.

In another disclosed embodiment of the method, the fixing element comprises at least three centering elements arranged circumferentially about the pin, and the step of moving the fixing element comprises moving the centering elements radially inward to urge the pin to the precisely aligned position.

In another disclosed embodiment, a fixture for positioning a component in a desired location in a first plane comprises a holder establishing a reference position within a second plane parallel with the first plane; a pin retained by the holder for movement relative thereto in the second plane within a range of coarse alignment about the reference position, the pin and holder movable together normal to the plane to engage the pin with the locating feature; and a fixing element movable, when the pin is engaged with the feature, to urge the pin to the reference position.

BRIEF DESCRIPTION OF THE DRAWINGS

Further features, details and advantages of the invention are revealed from the following description of the drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
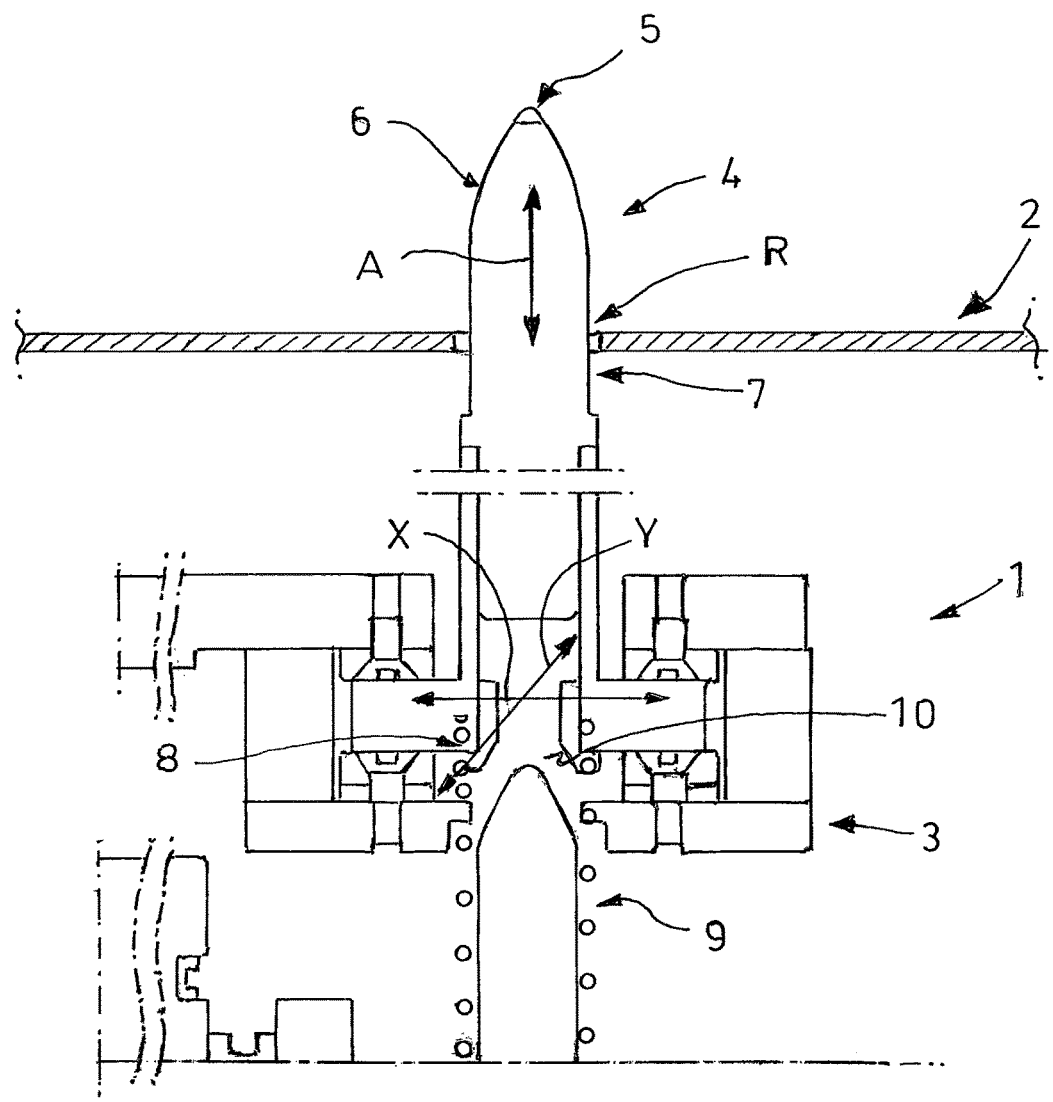
FIG. 1 shows a schematic longitudinal sectional view of a device comprising an adjusting pin during the insertion thereof into a locating hole on a body component.
Figure 2:
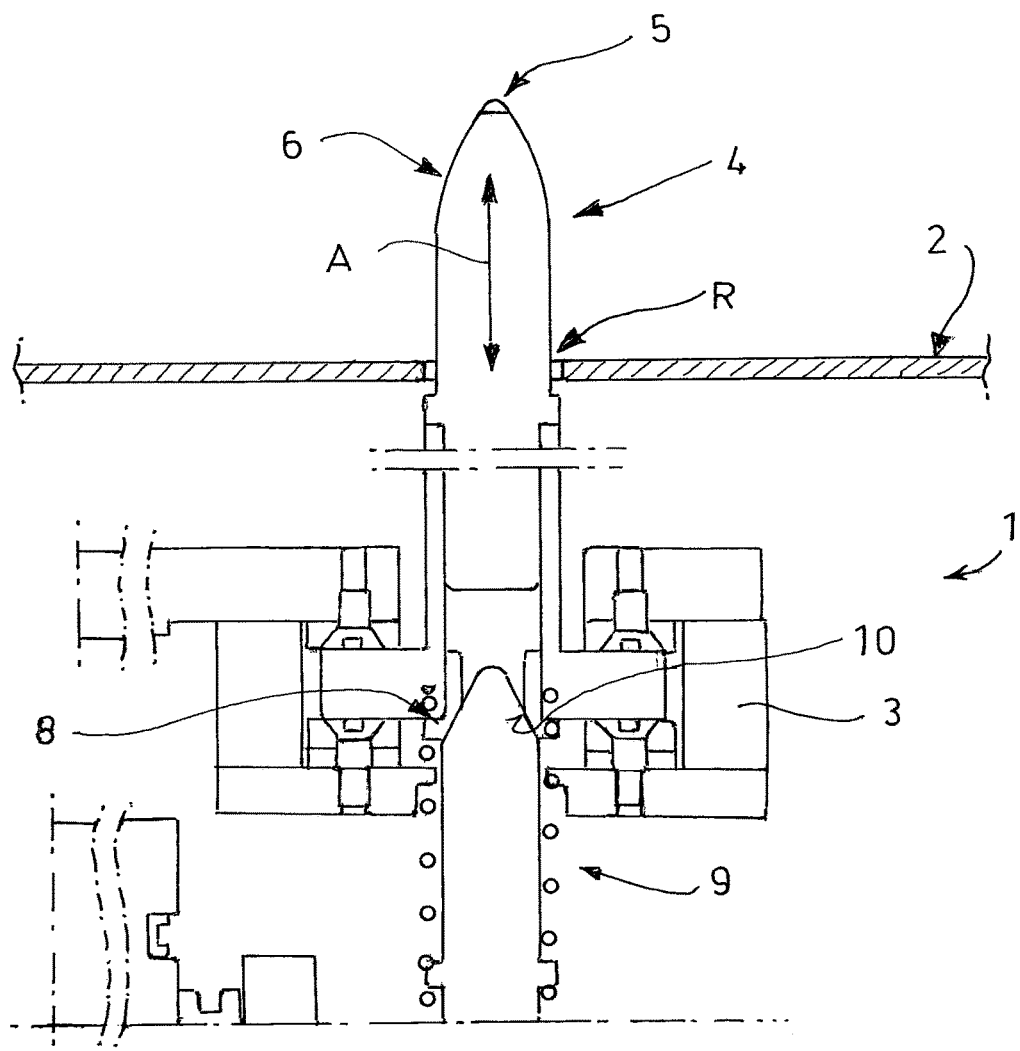
FIG. 2 shows a schematic view of the device of FIG. 1 after the insertion and during the alignment.

In FIGS. 1 and 2, an arrangement is shown for positioning and/or adjusting a component 2 in a desired position as established by a holder 3 using a adjusting pin 4 that engages a locating feature R of the component. The desired position of the component 2 may be relative to or as required by an assembly frame, a tooling fixture, or an industrial robot of the type used, for example, on an assembly line. By using the device, therefore, the component 2 is accurately positioned spatially so that assembly, machining, or forming operations, etc. may be subsequently carried out in an accurate manner.

If the adjusting pin 4 is intended for use with a circular locating feature, it may have a front cap region 5 at the end, a cone region 6 adjacent thereto in the axial direction and a cylinder region 7 adjacent thereto in the axial direction. Thus said adjusting pin is able to be inserted easily into a circular locating feature R in component 2.

The adjusting pin 4 is mounted in and retained by the holder 3 for movement relative to the holder in a plane normal to the axial direction A (as indicated by arrows X, Y) about a centered or reference position established by the holder. The range of movement allowed for pin 4 about the reference position of the holder 3 should be adequate for the pin to be inserted into feature R without damage thereto when the component is only coarsely or preliminarily aligned with its desired position. After the initial engagement of pin 4 with locating feature R, more precise spatial positioning is carried out as described below.

A fixing element 9 is disposed axially adjacent to the pin 4. The fixing element 9 is designed to be able to be brought into contact with the adjusting pin 4 to urge or move the pin to the reference position.

To this end, the fixing element 9 has an end with an first aligning surface (which in this embodiment takes the general shape of conical point) at its end which is inserted into a second aligning surface 10 in a mating region 8 of the adjusting pin 4. The second aligning surface is complementary-shaped with regard to the first aligning surface. In the depicted embodiment, the second aligning surface takes the general shape of a conical recess configured to receive the conical point of the first aligning surface. The position of the fixing element 9 in the X-Y plane is aligned with and establishes the desired, precise position of the locating feature R, so that mating engagement brings the adjusting pin 4 into precise alignment together with the component 2 (see FIG. 2).

As the pin 4 moves along the insertion axis A and engages the locating feature R, the pin is free to move relative to the holder 3 in the X-Y plane normal to the insertion axis. This allows the pin 4 to be inserted into the feature R even if the component 2 is in only coarse (less precise) alignment with the holder 3. The holder 3 establishes the precise, final position of the hole/component. The range of motion of the pin 4 relative to the holder 3 in the transverse plane determines the amount of initial misalignment that is permitted between the coarse position and the final, more precise position. When the fixing element 9 engages the pin 4, it urges the pin to a centered or reference position relative to the holder 3, and thus the pin and component are moved to the desired, final position.

Figure 3:
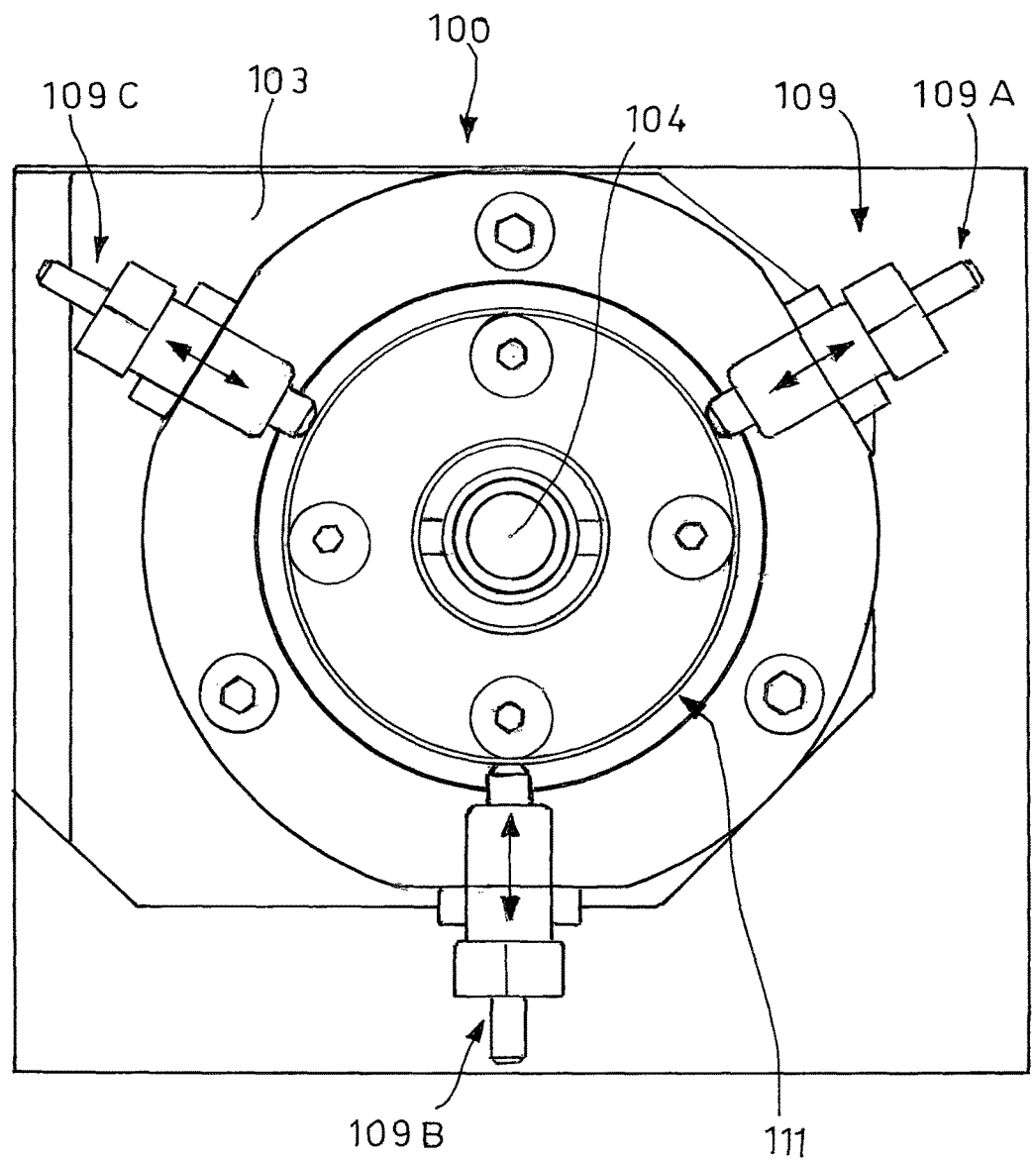
FIG. 3 shows an alternative embodiment of a device in a cross-sectional view during the alignment and FIG. 4 shows a schematic longitudinal sectional view of a further embodiment during the insertion into a locating hole on a body component.

In FIG. 3 a second embodiment is shown wherein the function and mounting of an adjusting pin 104 in the holder 103 is similar in many respects to the above device, so that only pertinent differences are referred to below.

A fixing element 109 comprising three centering elements 109 A, B, C. The centering elements are arranged around the circumference of adjusting pin 104 and each is movable linearly along its own axis toward and away from the adjusting pin 104 (as indicated by the double-headed arrows on each centering element). The adjusting pin 104 is also movably mounted (in a plane normal to the axis of the pin 104).

After the adjusting pin 104 is inserted into the locating feature, the centering elements 109 A, B, C are moved by one or more actuators (hydraulic, pneumatic, electrometric, or any appropriate power source) toward a ring 111 onto an end stop. The adjusting pin 104 is then connected to the ring 111 and floatingly mounted therewith. The centering pins 109 A, B, C are arranged on the periphery of the ring 111 and, in the depicted embodiment, are spaced apart by 120 degrees.

Thus, similar to in the first embodiment, the adjusting pin 104 may initially be inserted into the locating feature R when the component is only coarsely aligned with its desired, final position, and then urged to it final, precisely aligned position in the second step via movement of the centering pins 109, as the position thereof relative to the holder 103 is fixed.

Figure 4:
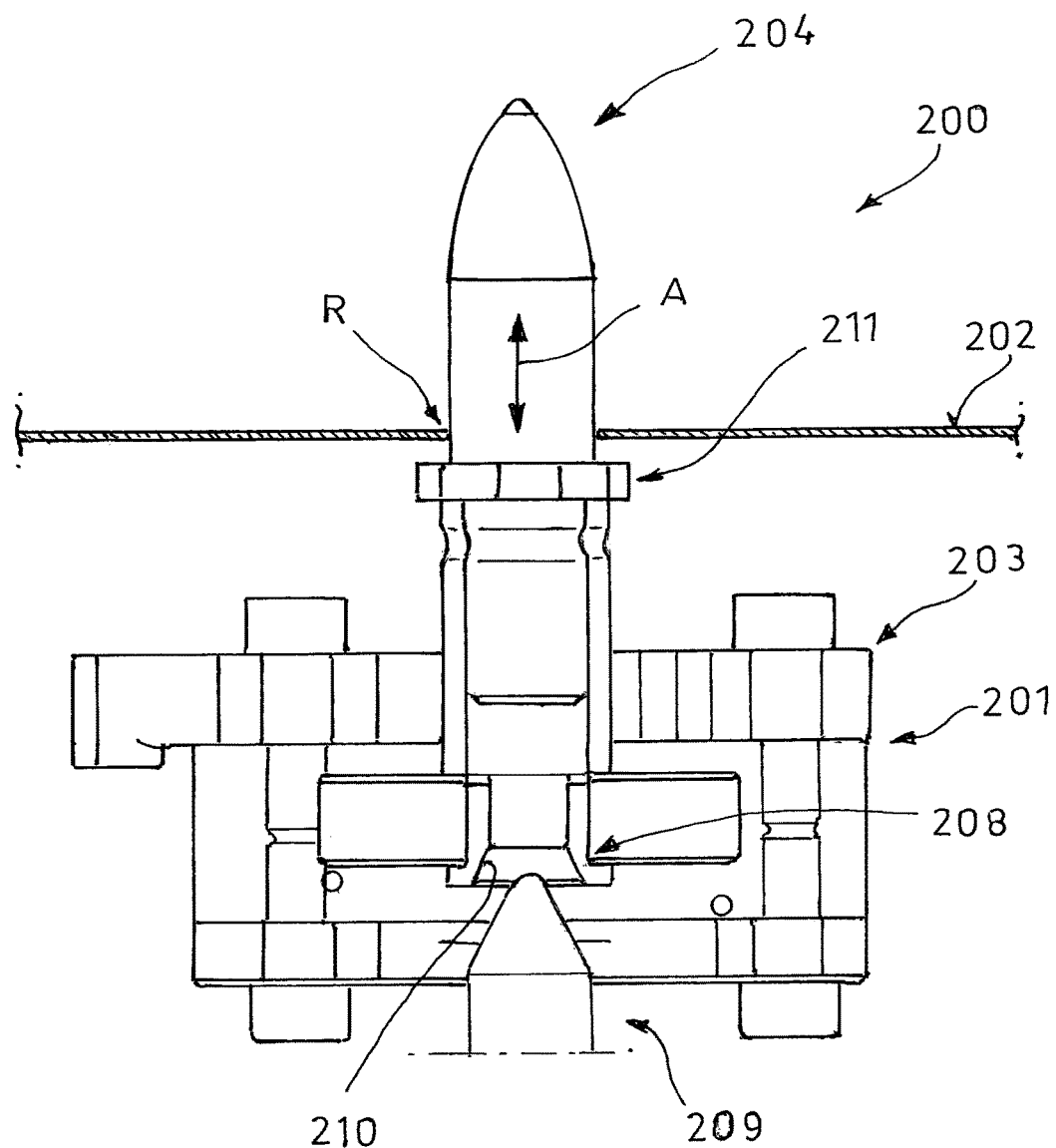

In FIG. 4 a further embodiment is shown, wherein the function and mounting of the adjusting pin 204 in the holder 203 is similar in many respects to the first device of FIGS. 1 and 2, so that only pertinent differences are discussed below.

In this embodiment, the adjusting pin 204 is also aligned via a fixing element 209 designed in the manner of a pin, which is inserted into an axially symmetric recess 210 in the connecting region 208 of the adjusting pin 204.

In contrast to the first embodiment, however, in this case the pin-like fixing element 209 is designed to be fixed in all axes, i.e. it does not move along the insertion axis A. When the pin 204 is inserted into the locating hole R, a peripheral collar 211 protruding from the cross section is pressed against the component 202, whereby the adjusting pin 204 with its axially symmetric region 210 is pressed downward onto the fixing element 209, and thus moved to the precisely aligned position as established by the fixing element.

It is understood that, in this case, the adjusting pin 204 is movable in a translatory manner in three directions (X, Y, A).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Apparatus comprising:
   a holder defining an aperture;
   a pin disposed at least partially within the aperture of the holder, the pin axially movable in an axial direction relative to a locating feature of a component, and laterally movable relative to the holder along a plane normal to the axial direction such that a central axis of the pin that extends through the aperture is movable within the aperture between a first vertical axis parallel to the axial direction and a second vertical axis parallel to the axial direction and offset from and parallel to the first vertical axis, the pin having a first end for engaging the locating feature and an opposite end with a first aligning surface;
   a fixing element movable, with the pin engaging the locating feature, relative to the holder along the axial direction to bring a second aligning surface of the fixing element into engagement with the first aligning surface, wherein movement of the fixing element in the axial direction moves the central axis of the pin in the plane from the first vertical axis to the second vertical axis, and wherein movement of the fixing element in the axial direction moves both the pin and the holder in the axial direction.

2. The apparatus of claim 1 wherein the fixing element includes a conical point adapted to be inserted into a recess defined by a mating region of the pin.

3. The apparatus of claim 2 wherein the mating region of the pin is a conical region adapted to receive the conical point of the fixing element.

4. The apparatus of claim 1 wherein the pin has an external surface defining a conical tip for insertion into a circular locating feature.

5. A fixture for positioning a component in a desired location comprising:
   a holder defining an aperture;
   a pin disposed at least partially within the aperture of the holder and laterally movable in a plane relative the holder such that a central axis of the pin that extends through the aperture is movable within the aperture from a first vertical axis normal to the plane to a second vertical axis normal to the plane and parallel to and offset from the first vertical axis, wherein the pin and the holder are movable together in an axial direction; and
   a fixing element movable relative to the holder and the pin along the axial direction to place a conical point of the fixing element into a mating region at an end of the pin, wherein movement of the fixing element in the axial direction moves the pin in the plane to move the central axis of the pin from the first vertical axis to the second vertical axis, and wherein movement of the fixing element in the axial direction moves both the pin and the holder in the axial direction.

6. The fixture of claim 5 wherein the mating region of the pin is a conical region adapted to receive the conical point of the fixing element.

7. The fixture of claim 5 wherein the pin has an external surface defining a conical tip for insertion into a circular locating feature.

8. Apparatus comprising:
   a holder;
   a pin extending within an aperture of the holder and laterally movable relative to the holder within the aperture; and
   a fixing element movable in an axial direction to move the pin from a first axis extending in the axial direction to a second axis extending in the axial direction parallel to and offset from the first axis, and to move both the pin and the holder in the axial direction.

9. The apparatus of claim 8 wherein the fixing element includes a conical point adapted to be inserted into a mating region of the pin.

10. The apparatus of claim 9 wherein the mating region of the pin is a conical region adapted to receive the conical point of the fixing element.

11. The apparatus of claim 8, wherein movement of the fixing element in the axial direction moves the pin toward a central axis of the aperture of the holder.

12. The apparatus of claim 8, wherein the aperture defines a central axis, wherein the first axis is parallel to and offset from the central axis, and wherein the second axis is parallel to and aligned with the central axis.

* * * * *